United States Patent Office 3,091,625
Patented May 28, 1963

3,091,625
PREPARATION OF ORGANIC TITANATES
Robert Thomas Gilsdorf, Wilmington, Del., assignor to E. I. du Pont de Nemours and Company, Wilmington, Del., a corporation of Delaware
No Drawing. Filed Oct. 21, 1960, Ser. No. 63,977
2 Claims. (Cl. 260—429.5)

This invention is directed to the preparation of organic derivatives of orthotitanic acid. More particularly, the present invention is concerned with preparing the titanium derivatives of 1,3-glycols having the structure

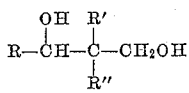

said structure containing from eight to twelve carbon atoms, R and R' being hydrogen or acyclic alkyl groups and R" an acyclic alkyl group. A variety of products fall into this class depending on the glycol and mole ratios of reactants utilized. These glycols form unusual titanium derivatives when there are two or more moles of glycol in the product molecule since they are far less sensitive to hydrolysis than are the ordinary organic esters of orthotitanic acid. This lack of water sensitivity, in addition to their solubility in a wide range of organic solvents, account for the widespread commercial acceptances of these derivatives. Many of these products are described in U.S. Patent 2,643,262 as being complex coordination compounds of titanium and the stability to hydrolysis is attributed to the coordination bonds formed between the free hydroxyls of the glycols and the titanium atom.

The method of U.S. Patent 2,643,262 for preparing these complex titanium derivatives of 1,3-glycols comprises reacting a simple titanium ester such as tetraisopropyl titanate with the appropriate quantity of glycol in an inert solvent. The product is a solution of the glycol derivative of structure $(RO)_{0-2}Ti(diol)_{2-4}$. A second type of product is obtained by hydrolysis of the first, giving $(HO)_{0-2}Ti(diol)_{2-4}$. This process for preparing 1,3-glycol titanium derivatives has the disadvantage of requiring the prior preparation of the simple titanium ester. While many simple esters of orthotitanic acid are articles of commerce, it would be preferable commercially to prepare the 1,3-glycol derivatives directly from titanium tetrachloride and avoid the necessity for prior preparation of the simple ester from titanium tetrachloride.

During the manufacture of simple esters of orthotitanic acid by reaction of titanium tetrachloride with an alcohol, hydrogen chloride is formed as a by-product which is removed by neutralization with ammonia (see U.S. Patent 2,187,821). The ammonium chloride formed must be filtered or otherwise removed from the titanium ester solution under anhydrous conditions. It is desirable, therefore, to provide a method for preparing orthotitanic acid derivatives of 1,3-glycols, which method does not require an anhydrous filtration.

It is an object of this invention to provide a novel process whereby titanium derivatives of 1,3-glycols may be prepared directly from a titanium tetrahalide such as titanium tetrachloride and a glycol. It is a further object of this invention to provide such a process wherein it is not necessary to filter an insoluble by-product from the reaction mass under anhydrous conditions.

These and other objects will become apparent in the following description and claims.

More specifically, the present invention is directed to an improved process for preparing organic solvent soluble orthotitanic acid esters of 1,3-glycols which process comprises (a) reacting one mole of titanium tetrachloride with two or more moles of a glycol having the structure

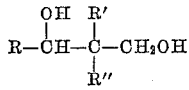

said structure containing from eight to twelve carbon atoms, R and R' being chosen from hydrogen and acyclic alkyl groups and R" is an acyclic alkyl group, in an inert organic solvent chosen from liquid aliphatic hydrocarbons and liquid aromatic hydrocarbons; (b) adding to said reaction mixture sufficient ammonia to make the mixture basic; and (c) thereafter contacting the resulting reaction product with water and recovering the organic solvent solution of the orthotitanic acid derivative.

The glycols which may be used in the present novel process have three things in common: (1) they are 1,3-glycols possessing at least one primary and no tertiary hydroxyl group, (2) the 2-carbon must be substituted by at least one alkyl group, and (3) the glycols must contain from 8 to 12 carbons. Within this framework, four types of glycols exist, i.e.

(1)
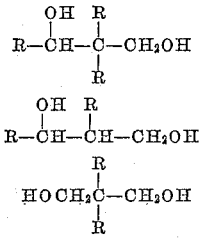

(2)

(3)

and (4)
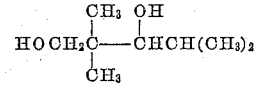

where, in each case, R is an alkyl group. A large number of glycols falling within these groups are known and the following glycols are representative:

$$HOCH_2\underset{\underset{CH_3}{|}}{\overset{\overset{CH_3}{|}}{C}}—\overset{\overset{OH}{|}}{C}HCH(CH_3)_2$$

HOCH₂C(CH₃)₂CH(OH)CH₂CH(CH₃)₂
HOCH₂C(CH₃)₂CH(OH)CH₂CH₂CH(CH₃)₂
HOCH₂C(CH₃)₂CH(OH)(CH₂)₃CH(CH₃)₂
HOCH₂C(CH₃)₂CH(OH)(CH₂)₆CH₃
HOCH₂C(C₂H₅)(nC₄H₉)CH(OH)CH₃
HOCH₂C(CH₃)(C₂H₅)CH(OH)CH₂CH(CH₃)₂
HOCH₂C(CH₃)(C₂H₅)CH(OH)CH(CH₃)(C₂H₅)
HOCH₂C(CH₃)(C₃H₇)CH(OH)CH(CH₃)(C₃H₇)
HOCH₂C(C₂H₅)₅CH(OH)CH(C₂H₅)₂
HOCH₂CH(C₂H₅)CH(OH)(C₃H₇)
HOCH₂CH(nC₃H₇)CH(OH)(nC₄H₉)
HOCH₂CH[CH(CH₃)₂]CH(OH)CH₂CH(CH₃)₂
HOCH₂CH[CH₂CH(CH₃)₂]CH(OH)CH₃
HOCH₂CH(nC₄H₉)CH(OH)(nC₅H₁₁)
(HOCH₂)₂C(CH₃)(nC₄H₉)
(HOCH₂)₂C(CH₃)(nC₅H₁₁)
(HOCH₂)₂C(CH₃)(CH₂)₃CH(CH₃)₂
(HOCH₂)₂C(CH₃)(nC₇H₁₅)
(HOCH₂)₂C(C₂H₅)(nC₄H₉)
(HOCH₂)₂C[CH₂CH(CH₃)₂]₂
(HOCH₂)₂CH(nC₇H₁₅)

Any known glycol having the heretofore-described requirements, can be used in the present process. Glycols of similar structure which possess less than eight carbons are not useful in this process since the products are not solvent soluble after contact with water. While glycols containing more than twelve carbons could probably be used, they are not readily available and appear to be of no commercial merit. The preferred glycol is 2-ethyl-1,3-hexanediol.

The preferred solvent is industrial grade heptane which comprises 2.3% aromatics, 0.6% olfins, 52.5% naphthenes and 44.6% paraffins, initial boiling point 200.7° F., dry point 210.5° F. Other hydrocarbons, either pure or mixtures, can be used so long as they have boiling points above about 65° C. and they are dry. Lower boiling hydrocarbons could be used but their high vapor pressure introduces operational hazards.

Liquid aromatic hydrocarbons may also be used, e.g., benzene, toluene and the xylenes, as well as certain haloaromatics such as chloro- or dichlorobenzene. These also must be dry. The aromatic solvents are somewhat more expensive and toxic than the aliphatics and are therefore less preferred.

The present novel process involves reacting titanium tetrachloride with two or more moles of a glycol of type herein described. This may be carried out by adding titanium tetrachloride to an anhydrous solution of the glycol in an inert solvent or the reverse, adding the glycol to the solution of titanium tetrachloride; an anhydrous filtration to remove by-product ammonium chloride or amine hydrochloride is not involved in the present process.

The other reaction variables are not critical; the reaction temperature may vary from the freezing point to the boiling point of the reaction mixture. It is usually preferable to carry out the reaction at slightly elevated temperatures. The reaction system must be kept anhydrous until the reaction between the glycol and titanium tetrachloride is completed by the addition of ammonia.

When the addition of glycol or titanium tetrachloride is complete, anhydrous ammonia is added until the mixture becomes slightly basic. An organic amine such as dimethylamine or pyridine can be used in the present process in place of ammonia. There is no advantage gained thereby and organic amines are more expensive than ammonia so the use of ammonia is definitely preferred. Sufficient water is then added with agitation to dissolve the ammonium chloride (or amine hydrochloride) formed. If exactly two moles of diol are used per mole of titanium tetrachloride, about one mole of a lower alcohol (e.g., isopropanol) is added to complete the reaction between glycol and titanium tetrachloride. No alcohol is necessary if more than two moles of diol are used initially. The two, mutually insoluble layers are separated and the organic solvent solution of the titanium derivative is recovered and dried. For most purposes, the solution needs no further treatment. If desired, the titanium derivative may be obtained pure by evaporation of the solvent.

The products obtained as a result of this novel process appear to have the structure

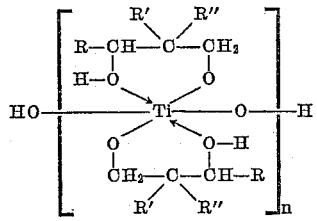

wherein $n$ is an integer which may be one or greater, similar to certain of the products obtained in U.S. Patent 2,643,262. As long as more than two moles of glycol are used per mole of titanium tetrachloride, the product appears to be the same. The products are soluble in most organic solvents and do not react readily with water to form hydrated dioxide.

The following representative examples illustrate the present invention.

*Example 1*

Titanium tetrachloride (86.25 g., 0.455 mole) was added during 30 minutes under anhydrous conditions to an anhydrous solution of 2-ethyl-1,3-hexanediol (133 g., 0.910 mole) and isopropyl alcohol (27 g., 0.450 mole) in industrial grade heptane (381 g.) maintained at 60 to 70° C. The reaction mass was then treated at 60 to 70° C. with a sufficient excess of anhydrous ammonia so that a mixture of a sample of the reaction mass with an equal volume of water caused Brilliant Yellow test paper to turn red. The reaction mass was cooled to 25° C. and water (250 g.) was added. This mixture was agitated for 30 minutes and allowed to stand. The mass rapidly separated into two almost clear liquid layers with a very small amount of interface material. The faintly hazy upper organic layer was separated and agitated with anhydrous sodium sulfate (12.5 g.) and Hyflo Super-Cel (12.5 g.) for 30 minutes. Filtration yielded 488 g. of a slightly colored clear solution which contained by analysis 7.15% titanium dioxide and less than 0.006% chlorine, indicating the presence of 96.0% of the charged titanium and essentially none of the charged chlorine.

*Example 2*

Example 1 was duplicated using 166 g. (1.135 moles) of 2-ethyl-1,3-hexanediol instead of the combination of 133 g. (0.455 mole) of 2-ethyl-1,3-hexanediol and 27 g. (0.450 mole) of isopropyl alcohol.

The clear solution of product in heptane weighed 518 g. and contained by analysis 6.68% titanium dioxide and less than 0.006% chlorine indicating the presence of 95.2% of the charged titanium and essentially none of the charged chlorine.

*Example 3*

Titanium tetrachloride (86.25 g., 0.455 mole) was added during 30 minutes under anhydrous conditions to an anhydrous solution of 2-ethyl-1,3-hexanediol (266 g., 1.819 moles) in dry benzene (381 g.) maintained at 60 to 70° C. The reaction mass was then treated with ammonia and water as described in Example 1. After treatment of the upper organic layer with anhydrous sodium sulfate and filter aid, 618 g. of clear slightly colored solution of product in benzene was obtained. It contained by analysis 5.69% titanium dioxide and less than 0.006% chlorine indicating a conversion of 96.8% of the charged titanium to a benzene soluble organic titanate.

As in Examples 1 and 2 two almost clear liquid layers rapidly separated after the water had been mixed into the reaction mass and the reaction mass was allowed to stratify.

*Example 4*

Titanium tetrachloride (86.25 g., 0.455 mole) was added during 30 minutes under anhydrous conditions to an anhydrous solution of 2,2,4-trimethyl-1,3-pentanediol (199 g., 1.364 moles) in industrial grade heptane (900 g.) maintained at 65 to 70° C. The reaction mass was treated with anhydrous ammonia as in Example 1. Water (250 g.) was then added and after 30 minutes agitation, the mixture was allowed to stand. Two clear layers failed to separate. However after heating the reaction mass to 55° C. and then allowing it to stand, two almost clear liquid layers formed. The faintly hazy upper organic layer was separated and agitated with anhydrous sodium sulfate (15 g.) and Hyflo Super-Cel (12.5 g.) for 30 minutes. Filtration yielded 1028 g. of a clear heptane solution of organic titanate containing by analysis 3.32% titanium dioxide and less than 0.006% chlorine indicating a conversion of 93.9% of the charged titanium to product.

*Example 5*

Titanium tetrachloride (86.25 g., 0.455 mole) was added during 30 minutes under anhydrous conditions to an anhydrous solution of 2-ethyl-2-butyl-1,3-propanediol (218.6 g., 1.364 moles) in industrial grade heptane (1100 g.) maintained at 60 to 80° C. After addition of ammonia and water as in Example 1, the reaction mass rapidly separated into two almost clear liquid layers after agitation was stopped. Treatment of the faintly hazy upper organic layer with anhydrous sodium sulfate and filter aid followed by filtration yielded 1235 g. of clear solution of the organic titanate in heptane. The product contained, by analysis, 2.85% titanium dioxide and less than 0.006% chlorine indicating 96.9% conversion of the charged titanium to product.

*Example 6*

When Example 2 was repeated using the same mole ratios of either 2,2-diethyl-1,3-propanediol or 2,2-dimethyl-1,3-propanediol, the reaction proceeded normally until water was added. At this point, hydrolysis occurred with gross precipitation of titanium containing hydrolysis products indicating that the complex products formed were not sufficiently stable to remain solvent-soluble after contact with water. The two glycols are, in themselves, fairly water-soluble whereas those used in the previous example are, at most, slightly water-soluble.

When Example 1 was repeated as above using 3,6-dimethyl-3,6-octanediol or 2,5-dimethyl-2,5-hexanediol, hydrolysis again occurred. These glycols, it should be noted, are not 1,3-glycols containing one primary and no tertiary hydroxyl group and an alkyl group in the 2-position.

Any of the heretofore-described glycols and organic solvents may be substituted in the representative preceding examples to give essentially the same results. As heretofore described, such reaction variables as temperature are not critical and may be varied by one skilled in the art without departing from the scope of the present invention.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows.

1. In a process for preparing organic solvent-soluble orthotitanic acid esters of 1,3-glycols, the improvement which comprises (a) reacting under anhydrous conditions 1 mole of titanium tetrachloride with at least two moles of a glycol having the structure

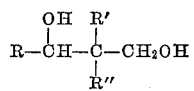

said glycol containing from 8 to 12 carbon atoms, R and R' of said glycol being selected from the group consisting of hydrogen and acyclic alkyl groups, R" is an acyclic alkyl group, said titanium tetrachloride being reacted with said glycol in an inert organic solvent selected from the group consisting of liquid alkane hydrocarbons and liquid aromatic hydrocarbons, (b) adding sufficient anhydrous ammonia to the reaction mixture produced by (a) to make said mixture basic, and then (c) contacting the reaction products of (a) and (b) with water forming aqueous and non-aqueous immiscible phases which are subsequently separated, and (d) recovering from the non-aqueous phase the orthotitanic acid derivative.

2. The process of claim 1 wherein the glycol is 2-ethyl-1,3-hexanediol.

References Cited in the file of this patent
UNITED STATES PATENTS

| | | |
|---|---|---|
| 2,187,821 | Nelles | Jan. 23, 1940 |
| 2,643,262 | Bostwick | June 23, 1953 |
| 2,654,770 | Herman | Oct. 6, 1953 |
| 2,655,523 | Herman | Oct. 13, 1953 |
| 2,684,972 | Haslam | July 27, 1954 |